United States Patent [19]

Suzuki et al.

[11] Patent Number: 4,930,008
[45] Date of Patent: May 29, 1990

[54] SCANNER FOR READING COLOR IMAGE

[75] Inventors: Kiyosuke Suzuki; Hideki Wanami, both of Saitama, Japan

[73] Assignee: Sony Corporation, Tokyo, Japan

[21] Appl. No.: 336,722

[22] Filed: Apr. 12, 1989

[30] Foreign Application Priority Data

Apr. 25, 1988 [JP] Japan ................... 63-102303

[51] Int. Cl.$^5$ ........................... H04N 1/028
[52] U.S. Cl. ........................ 358/75; 358/78
[58] Field of Search .......... 358/75, 78, 80, 41; 235/469, 468

[56] References Cited

U.S. PATENT DOCUMENTS

| 2,581,552 | 1/1952 | O'Hagan et al. ................ 235/469 |
| 3,990,043 | 11/1976 | Clark ................................. 235/469 |
| 4,553,160 | 11/1985 | Yamamoto et al. ............... 358/78 |
| 4,558,357 | 12/1985 | Nakagawa et al. ............... 358/75 |
| 4,560,866 | 12/1985 | Takenouchi et al. ............ 250/216 |
| 4,589,035 | 5/1986 | Yamanishi et al. ............... 358/78 |
| 4,652,913 | 3/1987 | Saitoh et al. ..................... 358/80 |
| 4,661,703 | 4/1987 | Ishikawa et al. ................ 250/317.1 |
| 4,670,779 | 6/1987 | Nagano ............................. 358/75 |
| 4,733,098 | 3/1988 | Seito et al. ....................... 250/578 |
| 4,750,048 | 4/1986 | Satoh et al. ...................... 358/287 |

FOREIGN PATENT DOCUMENTS

| 0049359 | 4/1982 | European Pat. Off. . |
| 0165550 | 12/1985 | European Pat. Off. . |
| 3218738 | 12/1982 | Fed. Rep. of Germany . |
| 3614888 | 11/1987 | Fed. Rep. of Germany . |
| 0046762 | 3/1983 | Japan ................................. 358/75 |
| 58-212255 | 12/1983 | Japan . |
| 0079865 | 5/1985 | Japan ................................. 358/75 |
| 60-107972 | 6/1985 | Japan . |
| 1577637 | 10/1980 | United Kingdom . |
| 2169176A | 7/1986 | United Kingdom ............... 358/75 |
| 2170673 | 8/1986 | United Kingdom . |

OTHER PUBLICATIONS

William K. Pratt, Digital Image Processing, pp. 72–73.
Heinwig Lang, Farbmetrik und Farbfernsehen, 1978, pp. 124–155.

Primary Examiner—Howard W. Britton
Assistant Examiner—Kim Yen Vu
Attorney, Agent, or Firm—Philip M. Shaw, Jr.

[57] ABSTRACT

A color image scanner which includes a plurality of light sources composed of a first light emitting diode for emitting a red light, a second light emitting diode for emitting a yellow light and a fluorescent light source for emitting a blue light, a control circuit for switching the plurality of light sources, sequentially and an image sensor for receiving light reflected from the original, scanned image, wherein a characteristic value of the light emitted from the first light emitting diode is selected so as to have an overlap in wavelength with that of the light emitted from the second light emitting diode, and a characteristic value of the light emitted from the fluorescent light source is selected so as to have an overlap in wavelength with that of the light emitted from the second light emitting diode.

10 Claims, 5 Drawing Sheets

SCANNER FOR READING COLOR IMAGE

BACKGROUND OF THE INVENTION

1. Field of the Invention

The present invention relates to a scanner for reading a color image which is suitably applied to a digital color image telegraphy apparatus, a color image telegraphy printer and so on.

2. Description of the Prior Art

A proposed scanner for reading a color image as part of a digital color image telegraphy apparatus, a color image telegraphy printer or the like is shown in FIG. 1, which is a cross-sectional view thereof, (see official gazette of Japanese laid-open patent application No. 58-212255).

As shown in FIG. 1, in this conventional scanner, a reading or scanning section 2 is located closely opposed to an original document 1. By "document" is meant any medium on which a color image can be formed, such as a photograph, printed image, fine art, or the like. On the original document 1, a color image is formed by some suitable method such as a printing-process or the like. The scanning section 2 is provided with a CCD (charge-coupled-device) line sensor 3 whose photo or image-detecting portion 3a is opposed to the original document 1. The photo-detecting portion 3a has a length (taken in the direction into the plane of the drawing as viewed in FIG. 1) corresponding to the width of the original document 1. A multi-lens-array 4 which is comprised of a plurality of rod-shaped lenses, each lens being aligned in a straight line configuration, is located between the photo-detecting portion 3a of the CCD line sensor 3 and the original document 1 such that the light of the image corresponding to one line of the original document 1 in its width direction can become incident on the photo-detecting portion 3a of the CCD line sensor 3 through the multi-lens-array 4.

A fluorescent light lamp or source 5 is provided proximate to the side wall of the multi-lens-array 4 for emitting a blue light. The lamp 5 has a length (again, taken in the direction perpendicular to the plane of FIG. 1) corresponding to the width of the original document 1. When the fluorescent light source 5 is lit, the original document 1 is irradiated with the blue light. A light emitting diode unit 6 is located or mounted on the scanning section 2 proximate to the side wall of the multi-lens-array 4 which is opposite to the fluorescent light source 5. The length of the light emitting diode unit 6 corresponds to the width of the original document 1.

Referring to FIG. 2, the light emitting diode unit 6 comprises a base plate 6a and a series of red and green light emitting diodes 6R and 6G which are alternately aligned on the base plate 6a in a straight line, wherein when the red light emitting diodes 6R are lit, they irradiate the original document 1 with a red light while when the green light emitting diodes 6G are lit, they irradiate the original document 1 with a green light.

Referring back to FIG. 1, the original document 1 close to the scanning portion 2 is transported by a plurality of rollers 7. The original document 1 is transported stepwise by the rollers 7 and at every line of the original document 1 it is irradiated with the red light by the red light emitting diodes 6R, the green light by the green light emitting diodes 6G and the blue light by the fluorescent light source 5 repeatedly in a time-division-manner. Then, a reflected, multicolored light image of the original document 1 is detected and is read by the photo-detecting portion 3a of the CCD line sensor 3. The colored, light image formed on the original document 1 is analyzed into the red, green and blue primary colors at every line so that the primary color signals of the color image forming one picture are read by transporting the original document 1 over its entire length.

Since the light emitting diodes are used as the light source as described above, the prior art scanner can be simplified in arrangement and the power consumed for the reading operation can be reduced.

The wavelength region of the light from the light emitting diodes are very narrow or severe so that neutral color light between (i.e. except) red, green and blue cannot be read precisely by the conventional scanner having the above-mentioned arrangement.

Specifically, the light emitting characteristics of the light emitting diodes 6R and 6G and that of the fluorescent light source 5 are generally demonstrated as shown in a graph forming FIG. 3, in which the red light emitting diodes 6R emit a light whose peak wavelength $\lambda p$ is equal to about 660 nanometers, the green light emitting diodes 6G emit a light whose peak wavelength $\lambda p$ is equal to about 555 nanometers and the blue fluorescent light source 5 emits a light of which the peak wavelength $\lambda p$ is equal to about 450 nanometers. Also, the half widths of the red and green lights from the light emitting diodes 6R and 6G are as narrow as about 30 nanometers, so that the respective light emitting wavelength regions do not have any overlap at all. For this reason, the prior art scanner as mentioned above cannot identify by its output signal a subtle difference between color tones of yellow group colors having a wavelength of about 600 nanometers which are between those of, for example, red and green.

Further, since the green light emitting diodes 6G are low in light emitting efficiency, the green light must be irradiated on the original document 1 for a duration of time longer than that of the other color lights and the scanning operation therefore needs plenty of time.

OBJECTS AND SUMMARY OF THE INVENTION

Accordingly, it is an object of the present invention to provide an improved scanner for reading a color image which can remove the defects encountered with the prior art.

It is another object of the present invention to provide a scanner having a simplified arrangement for reading a color image.

It is still another object of the present invention to provide a color image scanner which can precisely read a color image formed on an original document at high speed.

It is a further object of the present invention to provide a color image scanner suitable for use with a digital color image telegraphy apparatus, a color image telegraphy printer and so on.

According to an aspect of the present invention, there is provided a scanner for optically reading an original color image, comprising a plurality of light sources of illuminating the original color image, an image sensor for receiving light supplied by said plurality of light sources which is reflected from the original image and producing a corresponding output signal, and control means, supplied with the output of the image sensor for selectively switching the light sources on and off as the original image is scanned and producing corresponding primary color image output signals.

The light sources include a first light emitting diode for emitting a red light, a second light emitting diode for emitting a yellow light and a fluorescent light source for emitting a blue light. The plurality of light sources are arranged to selectively illuminate the original image. The characteristic value of the light emitted from the first light emitting diode is selected so as to have an overlap in wavelength with that of the light emitted from the second light emitting diode, and the characteristic value of the light emitted from said fluorescent light source is selected so as to have an overlap in wavelength with that of the light emitted from the second light emitting diode.

The above, and other objects, features and advantages of this invention will become apparent in the following detailed description of a preferred embodiment which is to be read in conjunction with the accompanying drawings, wherein like reference numerals identify the same or similar elements.

DETAILED DESCRIPTION OF THE PREFERRED EMBODIMENT

Figure 1:
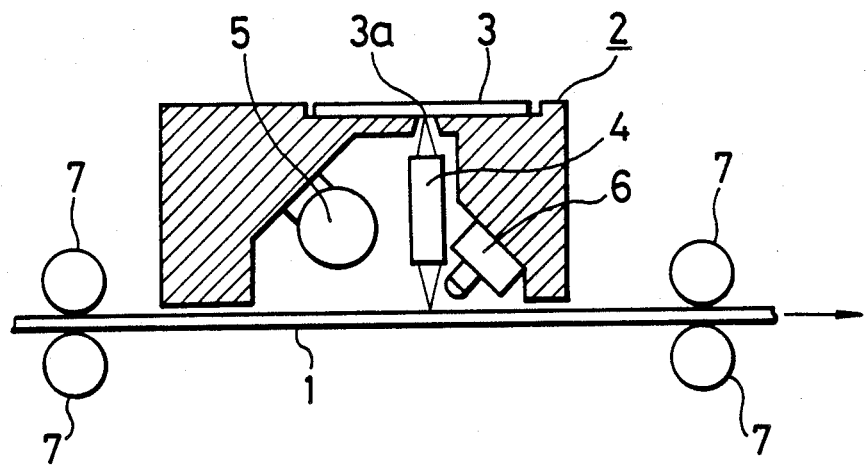
FIG.1 is a side view in cross-section illustrating an example of a prior art scanner for reading a color image.
Figure 2:
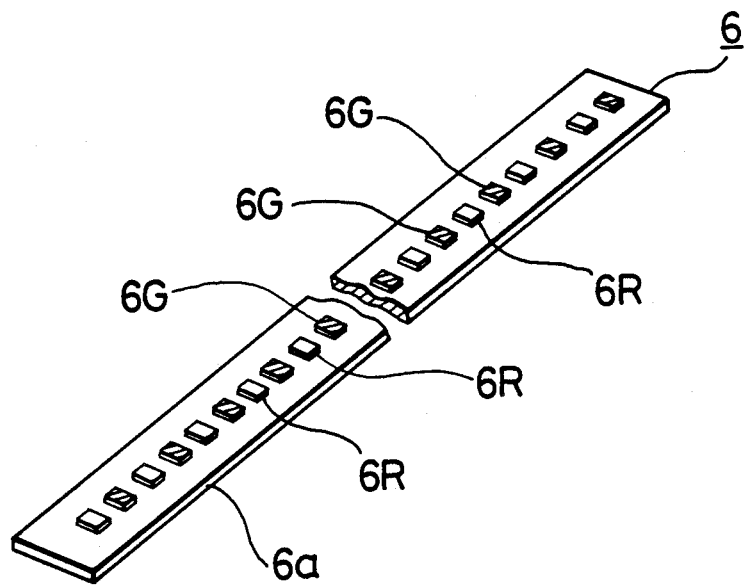
FIG. 2 is an enlarged perspective view, with portions broken away, illustrating a main portion of the prior art scanner shown in FIG. 1.
Figure 3:
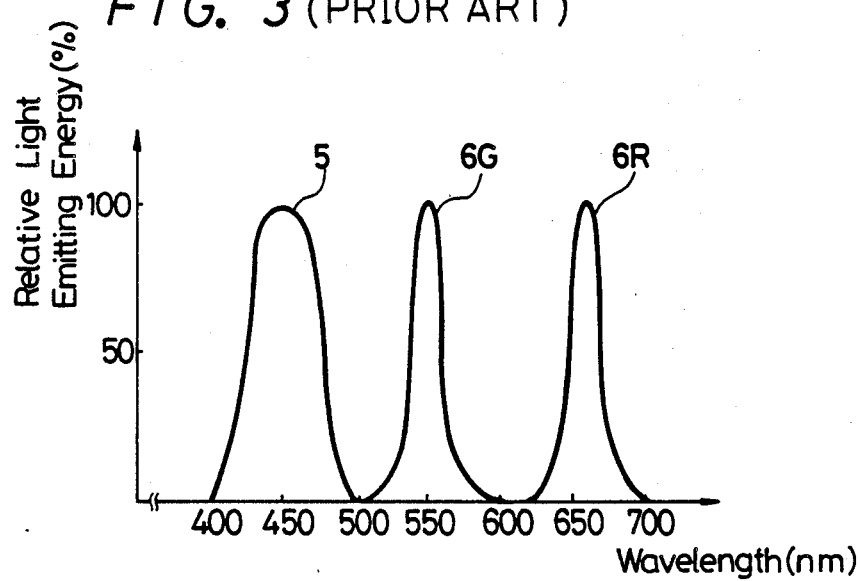
FIG. 3 is a characteristic graph used to explain the example of the prior art scanner shown in FIG. 1.

Now, an embodiment of a scanner for reading a color image according to the present invention will be described with reference to FIGS. 4 to 8. Throughout FIGS. 4 to 8, like parts corresponding to those of FIG. 1 are marked with the same references and therefore need not be described in detail.

Figure 4:
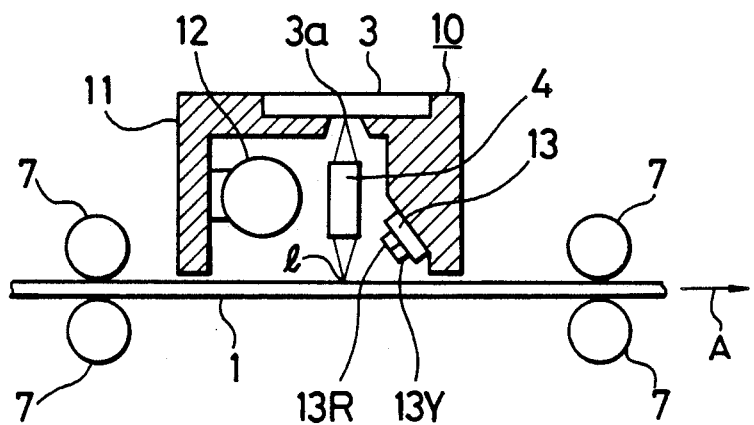
FIG. 4 is a side view in cross-section illustrating an embodiment of a scanner for reading a color image according to the present invention.

Referring to FIG. 4, there is shown an image scanning section 10 which includes a housing 11. The lower surface of the housing 11 is opened to which is closely opposed the original document 1 which can be transported by the plurality of rollers 7. The original document 1 is moved in the longitudinal direction thereof as represented by an arrow A in FIG. 4. On the upper surface of the housing 11, there is mounted the CCD line sensor 3 which includes the photo-detecting portion 3a whose length corresponds to the width of the original document 1 (in the direction perpendicular to its longitudinal direction). The multi-lens-array 4 is located between the photo-detecting portion 3a and the thus prepared original document 1. Near one side wall of the multi-lens-array 4, there is provided a fluorescent light lamp or source 12 which is fixed to the inside of the housing 11 and emits a light of the blue color group as will be described later. The length of the fluorescent light source 12 is selected to be substantially the same as the width of the original document 1. A light emitting diode unit 13 is fixed to the inside of the housing 11 at a position near another side wall of the multi-lens-array 4.

Figure 5:
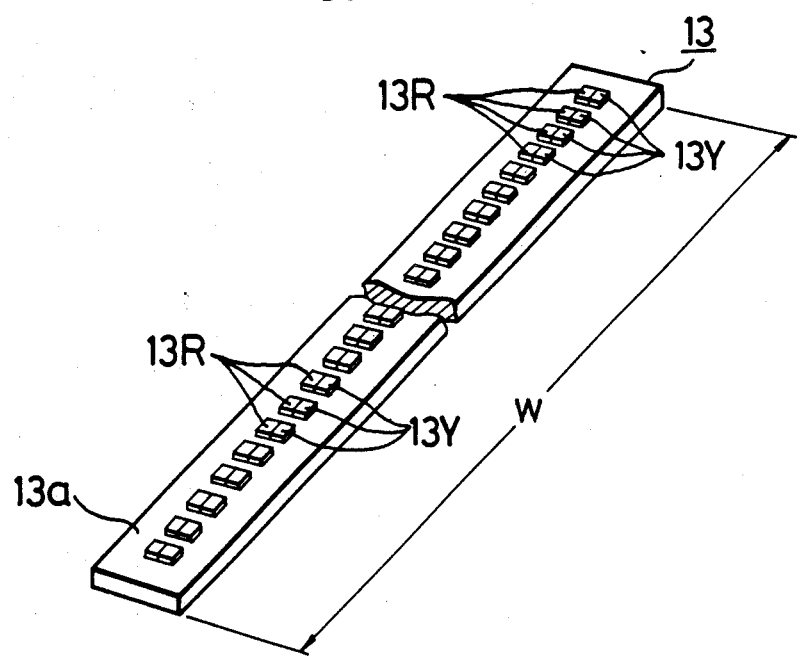
FIG. 5 is an enlarged perspective view, with portions broken away, illustrating a light emitting diode portion of the embodiment of the present invention shown in FIG. 4.

As FIG. 5 shows, the light emitting diode unit 13 comprises a base plate 13a having a configuration of a long plate 13a on Which are supported a plurality of pairs of light emitting diodes 13R and 13Y, with the diodes of each pair being aligned on the base plate 13a along the length direction of the original document 1. The pairs of diodes are distributed over the length of the plate 13a, corresponding to the width direction of the original document with a predetermined spacing between each pair of diodes. Thus, the plurality of light emitting diodes 13R and 13Y are aligned on the base plate 13a in two rows.

The light emitting diode 13R emits a light of reddish orange color group, while the light emitting diode 13Y emits a light of yelloW color group, as will be described more fully later. The length of the base plate 13a is selected to be substantially the same as the width of the original document 1.

The fluorescent light source 12 and the light emitting diode unit 13 are incorporated within the housing 11, whereby a line 1 on the original document 1 detected by the photo-detecting portion 3a of the CCD line sensor 3 is irradiated with reddish orange light and yellow light from the plurality of light emitting diodes 13R and 13Y, respectively, and blue light from the fluorescent light source 12.

Figure 6:
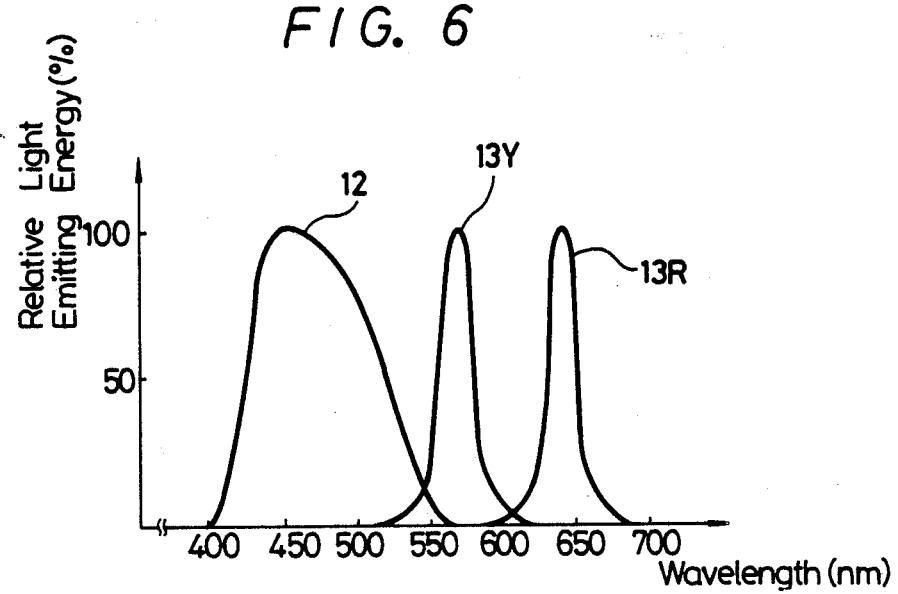
FIG. 6 is a characteristic graph used to explain the embodiment of the invention.

In this embodiment, the lights from the respective light emitting diodes 13R and 13Y and the fluorescent light source 12 are selected so as to have the characteristics shown in a graph forming FIG. 6. More specifically, a light emitting diode 13R is chosen which emits a reddish orange light, of which the peak wavelength $\lambda p$ is equal to 630 nanometers, and a light emitting diode 13Y is used which emits a yellow light of which the peak wavelength $\lambda p$ is equal to 568 nanometers. Further, a fluorescent light source 12 is chosen which emits a blue light having a peak wavelength $\lambda p$ is equal to about 450 nanometers, similar to that of a standard fluorescent light lamp, and also emits a blue light which is close to the wavelength region of the green color group whose upper limit extends to the wavelength of about 550 nanometers.

Since the peak wavelengths of the lights of respective color groups are determined as described above, the wavelength regions of the lights emitted from the respective light emitting diodes 13R and 13Y and the fluorescent light source 12 are made continuous, i.e. they overlap, so that the line on the original document 1 is irradiated with light having continuous wavelength regions ranging from about 400 to about 700 nanometers, as shown in FIG. 6.

When the image scanning section 10 scans or reads a color image formed on the original document 1, as shown in FIG. 4, the original document 1 is set in opposing relation to the image scanning section 10 and then the original document 1 is transported stepwise by the rollers 7 at a predetermined pitch in the direction shown by the arrow A in FIG. 4. When the original document 1 is transported step-by-step, each line is irradiated with the reddish orange light by the plurality of light emitting diodes 13R, each line is irradiated with yellow light by the plurality of light emitting diodes 13Y and each line is irradiated with the blue light by the fluorescent light source 12 in a time-division manner.

FIGS. 7A to 7G illustrate the irradiated conditions of the lights of the light color groups, respectively. Specifically, the irradiation of the reddish orange light (high level period in FIG. 7A), the irradiation of yellow light (high level period in FIG. 7B) and the irradiation of blue light (high level period in FIG. 7C) are repeatedly effected in a time-division manner under the control of a timing control circuit 18 (see FIG. 8) which will be described later. The irradiation of light of blue color group by the fluorescent light source 12 is carried out during a period somewhat longer than those of light of other color groups because the fluorescent light source 12 has a decay time from its characteristic standpoint.

As described above, when the original document 1 is transported step-by-step, the reddish orange light, the yellow light and the blue light are irradiated on the same line on the original document 1. At every irradiation of each color, the CCD line sensor 3 detects a light image by the irradiation and converts the detected light image into an electrical signal. Thus, the reddish orange light image, the yellow light image and the blue light image are detected at each line so as to read color images formed of three color groups. Thus, when the original document 1 is transported by the length of one picture by the rollers 7, a color image of one picture printed on the original document 1 can be read.

Figure 7A:
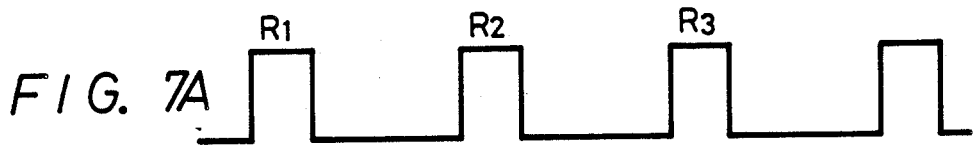
FIGS. 7A to 7G are waveform diagrams used to explain the embodiment of the present invention, respectively.
Figure 7B:
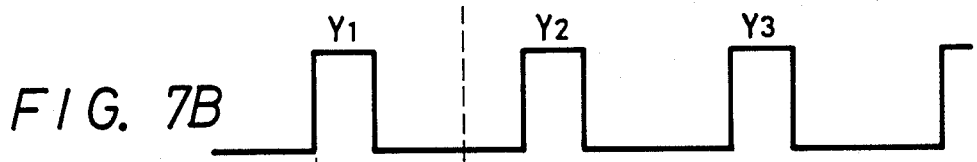
Figure 7C:
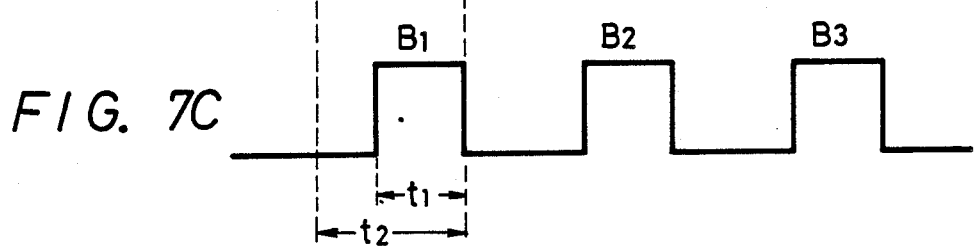
Figure 7D:
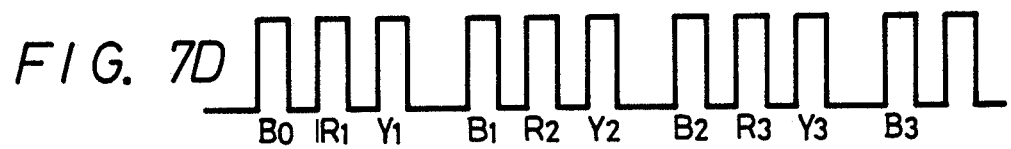
Figure 7E:
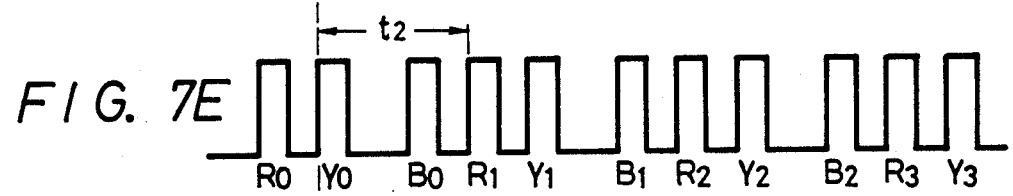
Figure 7F:
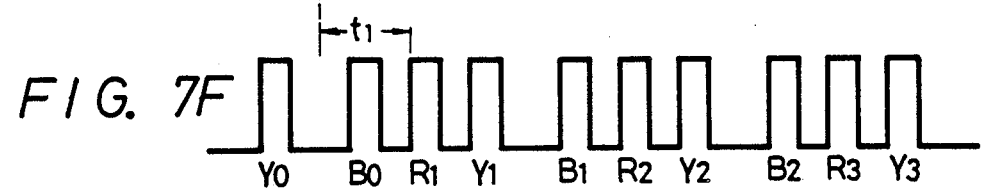
Figure 7G:
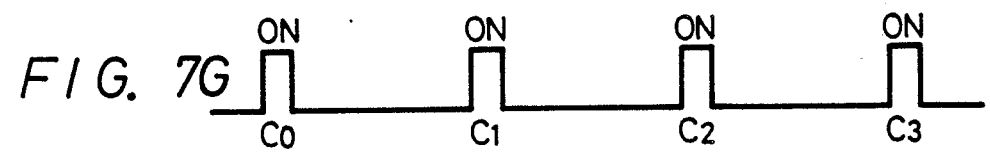
Figure 8:
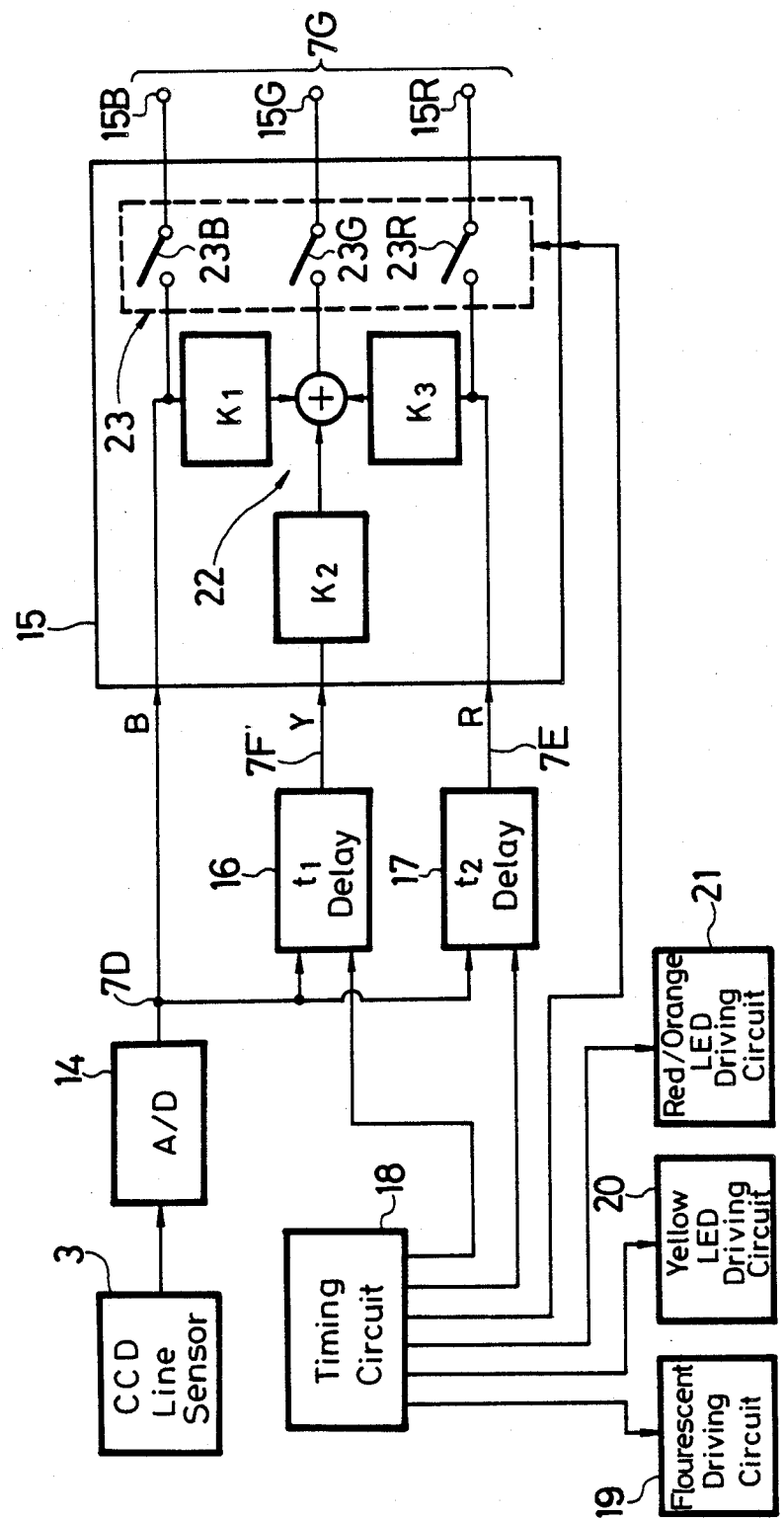
FIG. 8 is a block diagram showing a scanning signal processing circuit used in the embodiment of the present invention.

FIG. 8 shows in block a circuit arrangement which processes the output signal from the CCD line sensor 3. For the sake of clarity, certain of the signal lines appearing in the circuit of FIG. 8 have been assigned reference numerals corresponding to the waveforms of the signals appearing on those lines as shown in FIGS. 7D to 7G.

Referring to FIG. 8, the output signal derived from the CCD line sensor 3 as the image information is supplied to an analog-to-digital (A/D) converter 14, in which it is converted from the analog signal to a digital signal on line 7D (waveform in FIG. 7D). The digital signal from the A/D converter 14 is directly supplied to a color processing circuit 15. This digital signal from the A/D converter 14 is also supplied to a first delay circuit 16, which outputs a delayed signal on line 7F (waveform in FIG. 7F) to the color processing circuit 15, and to a second delay circuit 17, which outputs a delayed signal on line 7E (waveform in FIG. 7E) to the color processing circuit 15. The waveform of the output signal 7G, from the color processing circuit is shown in FIG. 7G.

In the color processing circuit 15 the signal 7D is supplied through a switch 23B to an output terminal 15B and through a coefficient adjustment circuit $K_1$ to one input of an adder 22. The signal 7F is supplied through a coefficient adjustment circuit $K_2$ to another input of the adder 22. The signal 7E is supplied through a switch 23R to an output terminal 15R of the color processing circuit 15 and through a coefficient adjustment circuit $K_3$ to still another input of the adder 22. The output of the adder is supplied through a switch 23G to an output terminal 15G of the color processing circuit.

The delay times of first and second delay circuits 16 and 17 are controlled by the timing control circuit 18. The timing control circuit 18 controls the light emitting operations of the fluorescent light source 12 and the light emitting diodes 13Y and 13R via a driving circuit 19 which drives the fluorescent light source 12, a driving circuit 20 which drives the yellow light emitting diode 13Y and a driving circuit 21 which drives the reddish orange light emitting diode 13R as in the conditions shown in FIGS. 7A to 7C, respectively.

The first delay circuit 16 is controlled by the timing control circuit 18 to delay the signal to be supplied to the color processing circuit 15 by the delay time of $t_1$ (see FIGS. 7A to 7C) corresponding to a period of time from the irradiation of blue light to the irradiation of the reddish orange light and then supplies the delayed signal to the color processing circuit 15. The second delay circuit 17 is controlled by the timing control circuit 18 to delay the signal to be supplied to the color processing circuit 15 by the delay time of $t_2$ (see FIGS. 7A to 7C) corresponding to a period of time from the irradiation of the yellow light to the irradiation of the reddish orange light and then supplies the delayed signal to the color processing circuit 15.

In operation, when a given line (line 1) of the original image is irradiated with red light, the reflected light image strikes the CCD line sensor 3 and it outputs a pulse signal, which is converted by the A/D circuit 14 to become a signal $R_1$ (FIG. 7D) which is supplied to the inputs of the delay lines 16 and 17 as well as to the color processing circuit 15. The switches 23B, 23G and 23R are open at this time. As can be seen from FIGS. 7E and 7F, the delay 16 delays the signal $R_1$ by a time $t_2$ and the delay 17 delays the signal $R_1$ by a time $t_1$. This process is repeated when a line of the original image is irradiated with yellow light so that a signal $Y_1$ is output from the A/D converter 14 and is supplied to the color processing circuit 15 and the delay circuits 16 and 17, where it is delayed by the time periods $t_1$ and $t_2$, respectively. Again, the switches 23B, 23G and 23R are open.

When the original image is irradiated by a blue light, the reflected light line image strikes the CCD line sensor 3 which outputs a signal which is converted by the A/D circuit 14 into a signal $B_1$. At this point the timing circuit 18 closes the switches 23B, 23G and 23R so that the signal $B_1$ is supplied directly to the terminal 15B and is multiplied by the coefficient $K_1$ and supplied to one input of the adder 22. The signal $Y_1$ is supplied as the output of the delay circuit 16 (FIG. 7F) and is multiplied by the coefficient $K_2$ and supplied to a second input of the adder 22. Simultaneously, the delay circuit 17 outputs the signal $R_1$ which is supplied directly to the terminal 15R and is multiplied by the coefficient $K_3$ and supplied to the third input of the adder 22. The output of the adder 22 is supplied to the terminal 15G.

The coefficients $K_1$, $K_2$, $K_3$ are determined by a predetermined characteristic value of yellow light so that the sum of $K_1R + K_2Y + K_3B = $ green light, where R, Y and B are the signals produced from the A/D circuit 14 for any particular scanned line of the original image. Together, the signals output at the terminals 15B, 15G, and 15R constitute a three primary color image signal 7G. In FIG. 7G the three primary color image signals for each scanned line are referred to successively as $C_0$, $C_1$, $C_2$, etc.

Since the scanner for reading a color image according to this embodiment is constructed as described above, this scanner is simplified in arrangement in that the light emitting diodes 13R and 13Y are utilized as the light sources for emitting lights of three colors. Thus, the wavelength regions of the irradiated light are made continuous, whereby the image color on the original document 1 can be precisely read within this continuous wavelength region. Since the signals converted into the standard three primary color signals by the circuit arrangement shown in FIG. 8 can be derived as the read signals, a standard color signal processing circuit can be used at the succeeding circuit stages of the arrangement of this scanner. Further, since a light emitting diode for emitting a yellow light is higher in light-emitting-efficiency than a light emitting diode which emits a green light, the image can be read at higher speed and with efficiency higher than that of the prior art scanner utilizing a light emitting diode which emits a green light.

The peak wavelengths of the lights irradiated from the light emitting diodes 13R and 13Y are not limited to those as described above, but it is possible to utilize light emitting diodes which emit lights having peak wavelengths near the above-mentioned peak wavelengths. In this case, it is preferable that the difference between the peak wavelength of the light from the reddish orange light emitting diode and the peak wavelength of the light from the yellow light emitting diode is selected to be about 50 to 70 nanometers to make the overlapped area of the wavelength regions of the irradiated lights sufficiently wide.

Further, while the fluorescent light is utilized as the blue light source in the above-mentioned embodiment, it is possible to utilize a fluorescent panel which can emit a similar blue light.

Although the scanner for reading a color image of the present invention is simple in arrangement in which the light emitting diodes 13R and 13Y are utilized as the light sources of three colors, the light emitting characteristics of the respective light sources have overlapping wavelengths so that the light receiving means or image sensor 3 receives lights having all of the wavelengths from red to blue reflected on the original document 1, thus making it possible to read the colors on the original document 1 precisely.

Since the light emitting diodes 13R and 13Y for emitting red and yellow light are high in light-emitting efficiency, the color image can be read at high speed.

It should be understood that the above description is presented by way of example on a single preferred embodiment of the invention and it will be apparent that many modifications and variations thereof could be effected by one with ordinary skill in the art without departing from the spirit and scope of the novel concepts of the invention so that the scope of the invention should be determined only by the appended claims.

We claim as our invention:

1. A scanner of the type which optically scans an original color image, comprising:
   (a) a plurality of light sources composed of a reddish-orange light emitting diode for emitting a reddish-orange light, a yellow light emitting diode for emitting a yellow light and a fluorescent light source for emitting a blue light, said plurality of light sources being arranged to selectively illuminate an original image and wherein the characteristic value of the light emitted from said reddish-orange light emitting diode is selected so as to have an overlap in wavelength with that of the light emitted from said yellow light emitting diode, and the characteristic value of the light emitted from said fluorescent light source is selected so as to have an overlap in wavelength with that of the light emitted from said yellow light emitting diode;
   (b) a diode unit plate upon which said reddish-orange and yellow light emitting diodes are mounted;
   (c) a line image sensor for receiving light supplied by said plurality of light sources which is reflected from the original image and producing a corresponding output signal;
   (d) means for effecting relative movement between the original image and the line image sensor and plurality of light sources so that the original image is illuminated and sequentially scanned over a plurality of width-wise lines; and
   (e) controlling means supplied with the output signal of said line image sensor for switching on and off said plurality of light sources sequentially and processing the line image sensor output signal to produce corresponding primary color image signals.

2. A scanner for reading a color image according to claim 1, in which said line image sensor is composed of a charge-coupled-device (CCD) line sensor.

3. A scanner for reading a color image according to claim 2, in which said line image sensor includes a multi-lens-array through which the light reflected from said original image passes to said CCD line sensor.

4. A scanner for reading a color image according to claim 1, wherein said reddish-orange and yellow light emitting diodes are mounted side-by-side as pairs, with the pairs being spaced apart in the direction corresponding to the width of the original image.

5. A scanner for reading a color image according to claim 1, wherein said image sensor outputs separate signals corresponding to blue, yellow and reddish-orange reflected light from said original image and said controlling means further includes separate, variable delay means for delaying the yellow and reddish-orange light signals output from the image sensor means, a color processing circuit which is supplied with the blue light signal output from the image sensor means and the yellow and reddish-orange light signals output from the respective delay means, and timing circuit means for controlling the delay period of each of the delay means to correspond to the periods of time between the switching on and off of the various light sources so that the color processing circuit receives the blue light signal, the yellow light signal, and the reddish-orange light signals in phase for each scanned line of the original image.

6. A scanner for reading a color image according to claim 5 further comprising means for effecting relative movement between the original image and the image sensor and the plurality of light sources so that the original image is illuminated and sequentially scanned over a plurality of width-wise lines.

7. A scanner for reading a color image according to claim 1, wherein the controlling means for processing the line image sensor output to produce corresponding primary color image signals comprises means for converting light received from one of the light sources from an analog signal to a digital signal in order to obtain a primary color image signal.

8. A scanner for reading a color image according to claim 1, further comprising an image scanning section located between said diode unit plate and said line image sensor.

9. A scanner for reading a color image according to claim 9, wherein said line image sensor is composed of a charge-coupled-device (CCD) line sensor, and said image scanning section is composed of a multi-lens-array through which the light reflected from said original image passes to said CCD line sensor.

10. A scanner of the type which optically scans an original color image, comprising:
  (a) a plurality of light sources composed of a reddish-orange light emitting diode for emitting a reddish-orange light, a yellow light emitting diode for emitting a yellow light and a fluorescent light source for emitting a blue light, said plurality of light sources being arranged to selectively illuminate an original image and wherein the characteristic value of the light emitted from said reddish-orange light emitting diode is selected so as to have an overlap in wavelength with that of the light emitted from said yellow light emitting diode, and the characteristic value of the light emitted from said fluorescent light source is selected so as to have an overlap in wavelength with that of the light emitted from said yellow light emitting diode;
  (b) a diode unit plate upon which said reddish-orange and yellow light emitting diodes are mounted;
  (c) a line image sensor for receiving light supplied by said plurality of light sources which is reflected from the original image and producing a corresponding output signal;
  (d) an image scanning section located between said diode unit plate and said line image sensor;
  (e) means for effecting relative movement between the original image and the image sensor and plurality of light sources so that the original image is illuminated and sequentially scanned over a plurality of width-wise lines; and
  (f) controlling means supplied with the output signal of said line image sensor for switching on and off said plurality of light sources sequentially and processing the line image sensor output signal to produce corresponding primary color image signals.

* * * * *